United States Patent [19]

Clark

[11] 3,904,512

[45] Sept. 9, 1975

[54] METHOD FOR RECLAIMING USED CRANKCASE OIL

[75] Inventor: Trevor P. Clark, North Vancouver, Canada

[73] Assignee: British Columbia Research Council, Vancouver, Canada

[22] Filed: Dec. 26, 1973

[21] Appl. No.: 428,370

[52] U.S. Cl. ............................... 208/182; 208/296
[51] Int. Cl.² ........................................ C10M 11/00
[58] Field of Search ........... 208/182, 181, 307, 299, 208/296, 184

[56] References Cited
UNITED STATES PATENTS

| | | | |
|---|---|---|---|
| 299,324 | 5/1884 | Baynes et al. | 208/307 |
| 1,769,794 | 7/1930 | Leamon | 208/307 |
| 1,842,983 | 1/1932 | Hanke | 208/181 |
| 2,106,010 | 4/1934 | Giacomo et al. | 208/182 |
| 2,316,954 | 4/1943 | Hancock | 208/296 |
| 3,417,012 | 12/1968 | Morace et al. | 208/181 |

Primary Examiner—Delbert E. Gantz
Assistant Examiner—G. J. Crasanakis
Attorney, Agent, or Firm—Fetherstonhaugh & Co.

[57] ABSTRACT

A method of reclaiming used crankcase oil wherein anhydrous zinc chloride is added to the oil, the mixture is heated and stirred under vacuum, and after the sludges generated are removed, the separated oil is further treated with clay and filtration to effect color removal.

7 Claims, No Drawings

METHOD FOR RECLAIMING USED CRANKCASE OIL

This invention relates to a new and improved method for reclaiming of used or waste crankcase oil so as to recover a major portion of said oil in a condition suitable for reuse as a lubricant.

It is known that petroleum lubricating and crankcase oil and the additives used therein oxidize or otherwise degrade, more or less rapidly depending upon the conditions of use, and must be replaced periodically with fresh oil. The disposal of this degraded oil without causing environmental hazards to air, land or water is difficult and, as a result, reclamation of spent crankcase oil has been practised for many years. Until recently, one widely used process for reclamation involved treatment of the spent oil with sulfuric acid to remove oxidized or degraded contaminants as a sludge, followed by treatment of the oil with activated clay for the removal of remaining color bodies. The development of high performance lubricating oils for modern automotive engines has, however, created difficulties for this reclamation process. The detergents, corrosion inhibitors and viscosity improving additives incorporated in these oils, along with their degradation products and those of the oil after use, give rise to a sludge that is not readily coagulated by sulfuric acid. As a result reclaimers using this process sometimes have to treat the oil two or more times with sulfuric acid to effect sludge removal and, this being uneconomic, many reclaimers have been forced to close their operations. This, along with increased use of automobiles and concomitant increase in the quantity of spent oil generated, is creating an increasing environmental problem with respect to disposal of the spent oil.

Other processes for the reclamation of spent oil have been disclosed. Among these is a process disclosed in U.S. Pat. No. 1,842,983, Jan. 26, 1932, and which teaches a sulfuric acid treatment step followed by the addition of an aqueous mixture of zinc chloride with caustic soda or other chemicals, and the removal by distillation of the lubricating oil. Under such conditions the effective ingredient is sodium zincate and not zinc chloride since the caustic soda reacts with the zinc chloride to form the sodium zincate. Furthermore recovery of the oil from the sludge by distillation is very costly. A second process is described in U.S. Pat. No. 3,417,012, Dec. 17, 1968, which teaches the addition of an aqueous mixture of sulfuric acid, zinc chloride and, if desired, other compounds, with subsequent steps to recover the reclaimed oil. Under such conditions the effective zinc compound is zinc sulfate and not zinc chloride as the sulfuric acid displaces the chloride in the form of hydrochloric acid.

In the above prior processes, sulfuric acid and caustic solutions are used. This raises the problem of the disposal of dangerous, corrosive sludges, and poor filtration. Frequently, the filtration is extremely difficult or even impossible due to colloidal sized sludges, and this problem often results in yields as low as 30%. Thus the use of sulfuric acids and caustic solutions is not satisfactory from economical and environmental standpoints.

The present invention eliminates the problems inherent in the prior processes mentioned above. The applicant has discovered that by using anhydrous (nonaqueous) zinc chloride in effective amounts, satisfactory coagulation of the sludge in used crankcase oil can be attained, and that under such anhydrous conditions no dangerous chemical additives are required. The reason for the increased effectiveness for sludge coagulation in spent crankcase oil of hot zinc chloride under anhydrous conditions, as opposed to aqueous solutions as taught in the prior art, is believed to be related to its ability to act as a dehydrating agent at temperatures of approximately 250°C, coagulant, desulfurizing agent and a flux for removal of metal oxides such as lead oxide.

The present method eliminates the use of dangerous concentrated acid, caustic soda or other chemicals, and the problem of separating the oil from the acid tars and sludges. These residues are difficult, dangerous and costly to dispose of. The present process removes all diluents, undesirable sulfur compounds, sludges and other contaminants. These compounds are quickly precipitated as a dry sludge with the zinc chloride which can be easily handled and is not hazardous. This zinc chloride sludge can be burned at about 500° to 600°C, and recovery of the zinc can be made as zinc chloride or zinc oxide. These can either be sold as a marketable by-product, or the zinc chloride can be recycled for use in the process.

The process according to the present invention for reclaiming used crankcase oil comprises the steps of mixing and stirring said crankcase oil with about 3 to about 10% weight of anhydrous zinc chloride, rapidly heating the mixture under vacuum to a temperature and for a time sufficient to free contaminants from the oil as vapor and sludge, separating supernatent oil from said sludge, mixing activated clay with the separated oil, stirring and rapidly heating the oil-clay mixture under vacuum to a temperature and for a time sufficient to provide a desired colour in the finished oil, and separating said oil from the clay sludge.

In general terms, this process comprises mixing used crankcase oil with a suitable amount of anhydrous zinc chloride, applying a vacuum to the mixture, heating the mixture under vacuum as rapidly as possible long enough to free the contaminants from the oil as vapor and sludge, allowing the mixture to cool and settle, separating the supernatent oil from the sludge, adding activated clay to the separated oil, applying a vacuum to the second mixture, heating the mixture under vacuum as rapidly as possible for sufficient time to provide a desired colour in the finished oil, and then separating the oil from the clay sludge. The separation of the sludge during the first step of the process can be accomplished in any suitable manner, such as by settling out the sludge and decantation of the partly refined oil, or by filtration or centrifugal action. A vacuum filter has been found satisfactory for separation by filtration. The separation of the clay sludge from the final product can be done in any suitable manner, such as by means of a leaf and frame filter press.

The following examples will serve to illustrate practical applications of the present process:

EXAMPLE 1

75 lbs. of used crankcase oil were pumped into a reactor and at the same time 4.5 llbs. of anhydrous zinc chloride were added, with continuous stirring. After applying a vacuum of 21.5 inches Hg, the mixture was heated as quickly as possible to 250°C and held at this temperature for 20 minutes.

The reaction products were then dumped into an open drum and allowed to cool and settle overnight. After the supernatent oil was decanted from the sludge, 10%w activated clay was added to the former and the mixture returned to the reactor. The mixture was heated as rapidly as possible to 185°C under vacuum and with stirring. After 20 minutes at 185°C the reaction products were filtered in a leaf and frame filter press.

Mass balances for two experiments carried out using this procedure are shown in the following Table I. It will be recognized that the distribution of the various fractions may differ substantially from those shown in Table I, the distribution being dependent upon the extent of contamination or degradation of the spent lubricating oil. The properties of the reclaimed oil are shown in the following Table II. In addition to the excellent properties shown for the oil in Table II, the oil exhibited no turbidity or odor as is sometimes characteristic of reclaimed crankcase oil.

In Example 1 the separation of the sludge from the partly refined oil after the zinc chloride reaction was accomplished by settling out the sludge and decantation of the partly refined oil. This settling process is slow and, to determine whether the sludge could be rapidly separated from the partly refined oil by fitration, the following test was carried out:

EXAMPLE 2

To 94g. of used crankcase oil were added 6g of anhydrous zinc chloride. The mixture was stirred and heated as rapidly as possible to 250°C under a pressure of 30 mm Hg. After a zinc reaction time of about 20 minutes the mixture was permitted to cool to about 80°C and was then filtered through a Buchner funnel into which a canvas filter cloth and a filter aid had previously been placed. The funnel was maintained at a temperature of 75°C and a pressure drop across the filter of 506 mm Hg was maintained. A rapid and complete separation of sludge from partly refined oil was found in that 110 ml of clear filtrate passed through the filter in less than 5 minutes.

It should be noted that the cooling to 80°C and filtration at 75°C was carried out only to simplify the experimental work. Those skilled in the art will recognize that precooling is not essential and that filtration at higher temperatures would increase the filtration rate since the viscosity of the partly refined oil would be reduced. Furthermore, it would not be necessary to supply as much additional heat for the subsequent clay reaction.

Although a batch process has been described, it can be made continuous by appropriate design and sizing of the reaction vessels and auxiliary equipment.

In addition to the above examples numerous other experiments were carried out to investigate the following process variables and their influence on the properties of the reclaimed oil:

a. concentration of anhydrous zinc chloride;
b. temperature of the zinc chloride reaction;

TABLE I

MASS BALANCES

| IN | LB E8 | LB E9 | OUT | LB E8 | LB E9 |
|---|---|---|---|---|---|
| Zinc Chloride Reaction | | | | | |
| Crankcase Oil | 75.00 | 75.00 | Distillates | 6.92 | 6.77 |
| Zinc Chloride | 4.50 | 4.50 | Zinc Sludge | 20.75 | 20.25 |
| | | | Part-refined Oil | 47.60 | 51.85 |
| | | | Unaccounted Loss | 4.23 | 0.63 |
| | 79.50 | 79.50 | | 79.50 | 79.50 |
| Clay Reaction | | | | | |
| Part-refined Oil | 46.00 | 50.25 | Distillates | 0.57 | 0.97 |
| Clay | 4.60 | 5.05 | Refined Oil + Clay Sludge | 49.50 | 54.00 |
| | | | Unaccounted Loss | 0.53 | 0.33 |
| | 50.60 | 55.30 | | 50.60 | 55.30 |
| Filtration | | | | | |
| Refined Oil + Clay Sludge | 49.50 | 54.00 | Clay Sludge | 8.30 | 10.47 |
| | | | Refined Oil | 41.20 | 53.14 |
| | | | Unaccounted Loss | — | 0.39 |
| | 49.50 | 54.00 | | 49.50 | 54.00 |

TABLE II

PROPERTIES OF RECLAIMED OIL

| | | E8 | E9 |
|---|---|---|---|
| Part-Refined Oil | | | |
| Neutralization No. | | 2.97 | 2.94 |
| Flash Point (Pensky-Marten) | °F | 280 | 220 |
| Refined Oil | | | |
| Neutralization No. | | 0.29 | 0.33 |
| Visual Color | | 4 | L 4½ |
| Flash Point (Pensky-Marten) | °F | 310 | 272 |
| Flash Point (Cleveland Open Cup) | °F | 395 | — a) |
| Viscosity, 100°F | cs | 61.7 | 53.5 |
| Viscosity, 210°F | cs | 7.9 | 7.0 |
| Viscosity Index | | 103 | 95.1 |
| Sulphated Ash | %w | 0.15 | .025 |
| Specific Gravity | 60°F/60°F | 0.876 | — a) |
| Conradson Carbon Residue | %w | 0.207 | — a) | a) Not measured for this sample.

c. time required for the zinc chloride reaction;
d. vacuum level applied during the zinc chloride reaction;
e. concentration of activated clay;
f. temperature of the clay reaction;
g. time required for the clay reaction;
h. vacuum level applied during the clay reaction.

The ranges of the process variables studied are shown in Table III, and are dictated as much by practical considerations as by technical factors. The purpose of use of anhydrous zinc chloride is to effect removal of both low boiling contaminants that would give rise to an unacceptably low flash point with the reclaimed oil and the semi-solid or solid contaminants that are similarly undesirable in reclaimed oil. The purpose of the clay is to effect removal of undesirable color bodies not previously removed with the sludge during the zinc chloride reaction. Our work was carried out on used crankcase oils obtained from a commercial reclaiming operation and are therefore generally typical of used oils of practical interest. In some cases, of course, used crankcase oils with either lesser or greater contamination with low boiling materials, semi-solid or solid materials and color bodies may be encountered.

TABLE III

RANGE OF PROCESS VARIABLES

| Process Variables | Range |
| --- | --- |
| 1) Zinc Chloride Reaction | |
| (a) Concentration of $ZnCl_2$, %w | 3 to 10 |
| (b) Reaction temperature, °C | 150 to 290 |
| (c) Reaction time, minutes | 20 to 30 |
| (d) Absolute pressure, mm Hg | 30 to 500 |
| 2) Clay Reaction | |
| (e) Concentration of clay, %w | 5 to 15 |
| (f) Reaction temperature, °C | 120 to 235 |
| (g) Reaction time, minutes | 20 to 60 |
| (h) Absolute pressure, mm Hg | 30 to 500 |

With the crankcase oils used in my study 3% weight zinc chloride resulted in a low flash point (230°F, Pensky-Marten) and sludge removal was not complete in that sludge recovered was only twice the weight of zinc chloride added as opposed to about five times the weight of zinc chloride added as in Example 1. Used crankcase oils with lower contamination and treated with 3% weight zinc chloride would yield an acceptable oil, but used crankcase oils of such low contamination as to be successfully treated with less than 3% weight zinc chloride are unlikely to be encountered. Similarly, used crankcase oils of such high contamination as to require in excess of 10% weight zinc chloride would yield too little reclaimed oil to be economically viable.

The concentration of clay required for removal of color bodies is similarly governed by the degree of contamination of the used crankcase oil to be reclaimed.

The reaction temperature, reaction time and absolute pressure used for the zinc chloride and clay reactions will also govern the properties of the reclaimed oil in a manner well known to those skilled in the art of chemical processing. The particular set of process conditions to be used will vary according to the degree of contamination of the used crankcase oil to be processed. For example, if the used crankcase oil contains a very high level of solvent or gasoline contamination, it may be necessary to use a lower pressure or a longer time for the zinc chloride reaction than are shown in Table III. If the used crankcase oil contains a very low level of such contaminants and degradation products it may be possible to use shorter reaction times in both the zinc chloride and clay reaction steps than are shown in Table III.

I claim:

1. A process for reclaiming used crankcase oil comprising the steps of mixing and stirring said crankcase oil with about 3 to about 10%w of anhydrous zinc chloride, rapidly heating the mixture under vacuum to a temperature of 150° to 290°C for a time sufficient to free contaminants from the oil as vapor and sludge, separating the supernatent oil from said sludge, mixing activated clay with the separated oil, stirring and rapidly heating the oil-clay mixture under vacuum to a temperature and for a time sufficient to provide a desired color in the finished oil, and separating said oil from the clay sludge.

2. A process as claimed in claim 1 in which the used oil is heated to a temperature of from about 175° to about 290°C and maintained at said temperature for about 20 to 30 minutes.

3. A process as claimed in claim 1 in which the amount of clay added to the separated oil is from about 5 to about 15%w.

4. A process as claimed in claim 3 in which the oil-clay mixture is heated to a temperature of from about 120° to about 235°C, and maintained at said temperature for about 20 to about 60 minutes.

5. A process as claimed in claim 1 in which the separation of the supernatent oil from the sludge is accomplished by cooling and settling the mixture and then decanting the oil from the sludge.

6. A process as claimed in claim 1 in which the separation of the supernatent oil from the sludge is accomplished by means of a suitable filter.

7. A process for reclaiming used crankcase oil comprising the steps of mixing and stirring said crankcase oil with about 3 to about 10%w of anhydrous zinc chloride, rapidly heating the mixture under absolute pressure of about 30 to about 500 mm Hg to a temperature of about 175° to 290°C for about 20 to about 30 minutes to free contaminants from the oil as vapor and sludge, separating the supernatent oil from said sludge, mixing for about 5 to about 15%w activated clay with the separated oil, stirring and rapidly heating the oil-clay mixture under about 30 to about 500 mm Hg to a temperature of about 120° to 235°C for about 20 to about 60 minutes, and separating the oil from the clay sludge.

* * * * *